June 23, 1964 F. M. SHONKWILER 3,137,984
COMBINE GRAIN TABLE HEIGHT ADJUSTER
Filed March 8, 1961 6 Sheets-Sheet 1

FIG.-1

INVENTOR
FOREST M. SHONKWILER
BY Herbert A. Minturn
ATTORNEY

June 23, 1964

F. M. SHONKWILER 3,137,984

COMBINE GRAIN TABLE HEIGHT ADJUSTER

Filed March 8, 1961

INVENTOR
FOREST M. SHONKWILER
BY Herbert A. Winturn
ATTORNEY

June 23, 1964     F. M. SHONKWILER     3,137,984
COMBINE GRAIN TABLE HEIGHT ADJUSTER Filed March 8, 1961                        6 Sheets-Sheet 4

INVENTOR
FOREST M. SHONKWILER.
BY Herbert A. Venturn
ATTORNEY

United States Patent Office 3,137,984
Patented June 23, 1964

3,137,984
COMBINE GRAIN TABLE HEIGHT ADJUSTER
Forest M. Shonkwiler, near Crawfordsville, Ind.
(18580 Roosevelt Road, South Bend, Ind.)
Filed Mar. 8, 1961, Ser. No. 94,187
9 Claims. (Cl. 56—214)

This invention relates to a controlling mechanism for selectively manually or automatically controlling the height of a grain table on a self-propelled combine, or a tractor-pulled or tractor-mounted combine which is commonly used in harvesting small grain such as oats, wheat, soybeans, grass seeds, and now even the harvesting of corn, and other like grain or feed crops.

Attempts have been made to provide a mechanism which would automatically maintain the cutter bar carried along the forward side of a grain table or platform at a uniformly fixed distance above the ground, regardless of the contour of the ground, presence of clods or stones, and ridges or the like produced or set up in the cultivation of the crops. In spite of these attempts, the combine operators have adhered largely to a manual control which required extreme vigilance on the part of the operator to keep the cutter bar down as low as possible and yet to prevent it from digging into the dirt at the most unexpected time as the combine progresses over the ground.

It is to be understood that the normal condition of the ground on which the combine is to travel in its harvesting operation is substantially never perfectly smooth. For example, in the growing of soybeans, the cultivator will usually draw dirt from between the rows to form a ridge from which the stalks of the beans extend. The ridges of course are necessarily formed during the cultivating process to aid in covering up weeds. Also the cultivation between rows will usually leave valleys and ridges, the wheels of the combine riding on the ridges at times, and at other times riding the valleys between the ridges. Furthermore, several ridges will be traversed in the movement of the combine, that is the cutter bar will extend across several ridges in the combining action.

Again in order to obtain the maximum harvested grain (including all combine harvestable seeds and grain) it is necessary, particularly in handling soybeans, to have the cutter bar cut the bean stalks as near as possible to the ground in view of the fact that many of the high yielding varieties of beans will have bean pods extending down to almost in contact with the ground, and the leaving of several pods on stalks will of course materially reduce the overall yield of the field. Heretofore it has been necessary to keep the cutter bar elevated above the lowermost pod in order to prevent the guards of the cutter blades from digging into the dirt of the ridges along the beans.

Normally, the operator will be extremely busy in keeping the combine straddling the proper rows of row crops, or when the crops have been broadcast, in maintaining the proper width of cut without having to watch the elevation of the cutter bar under manual control.

In further regard to securing the maximum yield in harvest, relating to soybeans again, Purdue Experiment Station of Purdue University during the past six years has checked the loss of beans in reference to the height of stubble of the stalks left in the field. One of the most popular varieties of beans grown in Indiana and Illinois today will have the bean pods extending down a stalk to the ground, and when the stubble is cut six inches high from the ground, there will be approximately sixteen percent of the total bean yield left in the field, whereas if the stubble is cut four inches high, there will be approximately eight percent of the bean yield left in the field. Hence it is to be seen that the combine cutter bar must operate closely with the ground with a minimum clearance, and that of course provides a clearance between the ground and the cutter head so slight, that the operator hasn't much time to react upon seeing an obstruction between the four inch height and the six inch height, over which obstruction the cutter bar must be lifted and then thereafter lowered.

With my invention, the cutter bar may be originally set for the desired stalk cutting height, and thereafter, the operator's attention will be confined almost entirely to the driving of the combine to secure the maximum swath being cut in broadcast crops and in insuring the proper number of rows of row crops being straddled.

It is a primary purpose of the present invention to provide a full automatic, in addition to a manual cutting bar elevation control mechanism; a structure reducing operator fatigue; a structure reducing the chance of picking up of stones or digging into the soil; the provision of an entirely hydraulic control in the absence of all electrical controls and driving mechanisms; an easily installed mechanism; and the gaining of the maximum possible harvest yield.

These and many other objects and advantages of the invention will become apparent to those versed in the art in the following description of one particular form of mechanism as illustrated in the accompanying drawings, in which.

There is a cutter bar generally designated by the numeral 20 mounted in the usual manner entirely across the front edge portion of the platform, generally designated by the numeral 21, of the combine generally designated by the numeral 22. A sickle bar 23, FIG. 2, is slidingly carried longitudinally along the bar 20 all in the usual and well known manner. A plurality of guards 25 are also fixed to the bar 20 with the usual forwardly pointed ends. In the normal operation of the combine, the crop being harvested is cut by the shearing action between the knives 24 and the side edges of the ledger plates 25a of the guards 25. The combine is moving forwardly against the material to be cut, and there is the usual reel 26 turning clockwise, FIG. 1, carrying the grain back onto the platform 21. The cut off stalks will drop downwardly onto the platform 21, and there is the usual mechanism (not shown) carrying those stalks on up and into the combine for threshing. This platform 21 and its interconnecting conveying chute 27 is hinged to the forward side of the combine at a pivot axis through the connecting pin or rod 28, FIG. 1. In other words the platform 21 is rocked upwardly and downwardly about the pivot 28 depending upon the elevation of the ground and the height above the ground at which the material is to be cut.

One or more hydraulic cylinders 29 has an end thereof hooked to either the combine or the platform 21, herein shown as being hooked to the platform 21 at the rear thereof, and has a piston rod 30 extending from the cylinder 29 to rockably engage in the present showing with a relatively fixed point 31. By supplying hydraulic fluid to the end of the cylinder adjacent to the platform 21, the platform 21 will be rocked upwardly, and in reverse, allowing the pressure to be dissipated from the cylinder 29 will permit the platform 21 to lower.

So much of the construction described is well known to those versed in the art.

I mount a pair of shafts 32 and 33 on the underside of the bar 20, one shaft in longitudinal alignment with the other, and both shafts parallel with the bar 20. Each of these shafts 32 and 33 is mounted to be rotatable about their axes in brackets 34, preferably mounted one at each adjacent end of the shafts on the bar 20, FIG. 4.

Figures 4, 5, 6, 7, 8, 9, 10, 11:
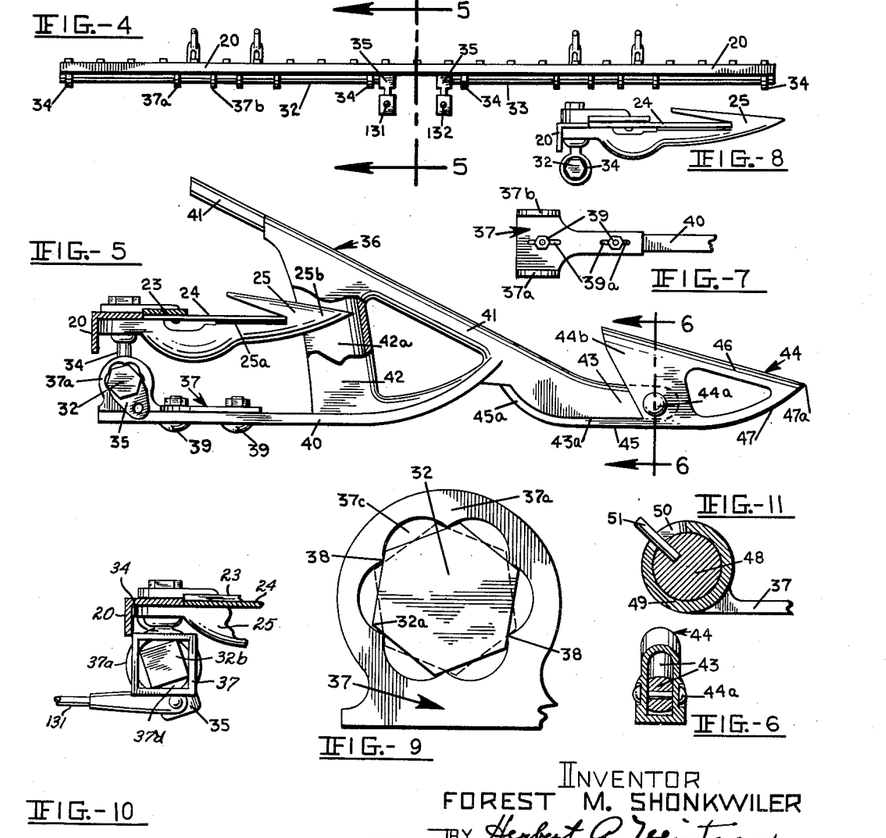
FIG. 4 is a view in rear elevation of the cutter bar.
FIG. 5 is a view in vertical section on the line 5—5 in FIG. 4 on an enlarged scale.
FIG. 6 is a view in section on the line 6—6 in FIG. 5.
FIG. 7 is a detail in top plan view of a rocker mounting bracket on a reduced scale.
FIG. 8 is a detail in end elevation of a rocker actuating shaft mounting.
FIG. 9 is a detail in end elevation on a further enlarged scale of a shaft connection with a rocker bracket on an enlarged scale.
FIG. 10 is a view in detail in end elevation and partial section of a modified form of a rocker actuating shaft.
FIG. 11 is a detail in vertical section of a further modified rocker actuating shaft.

In the present showing, each of these shafts 32 and 33 is of the same cross-sectional shape and dimensions, herein shown as being hexagonal, although the shaft in each instance may assume a different shape such as a square section 32b shown in FIG. 10, or a circular section 48 as is shown in FIG. 11 later described.

Figure 2:
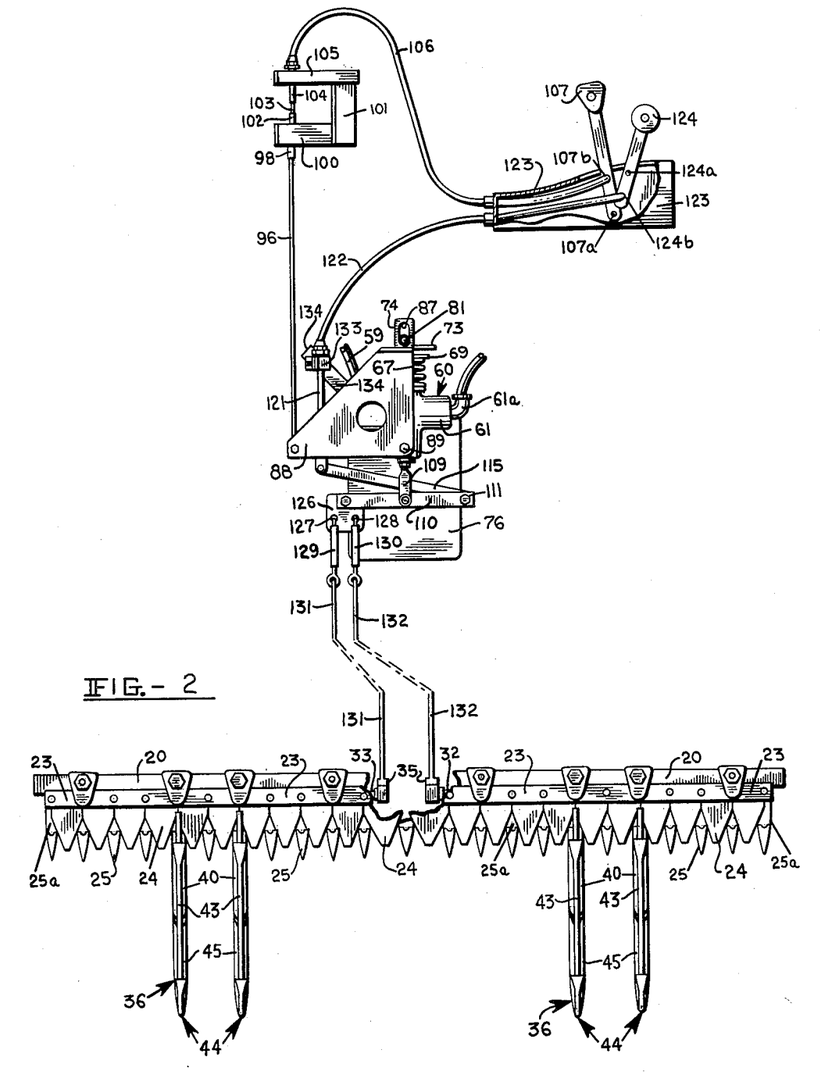
FIG. 2 is a diagrammatic representation of a control removed from the combine.
Figure 3:
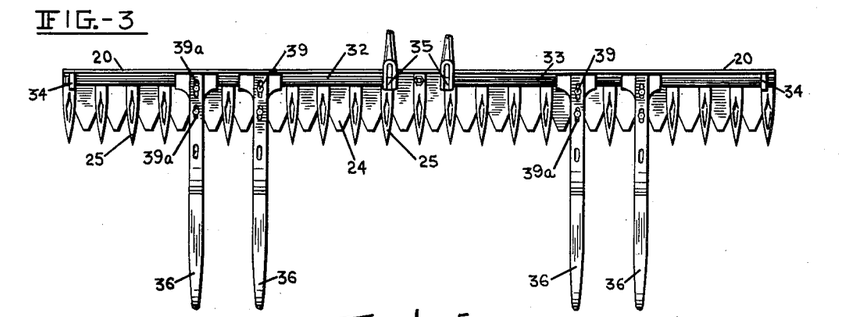
FIG. 3 is a view in bottom plan view of a cutter bar with rockers attached.

Referring to FIGS. 2, 4, and 5, a limited number of rockers 36 are carried by the shafts 32 and 33, herein shown as two in number on each shaft. Each of the shafts 32 and 33 carries thereon brackets 37, one for each rocker 36. Each bracket 37 has a pair of upturned spaced apart ears 37a and 37b, each ear having a hole 37c therethrough with a roughly hexagonal periphery, the periphery being relieved between the six points 38, FIG. 9. The hexagonal shafts 32 and 33 pass through these holes 37a and 37b. The brackets 37 may turn a limited number of degrees of rotation about the shafts before being stopped by the corners 32a of the shafts. Each rocker 36 is fixed to the underside of the bracket 37, FIGS. 3 and 4, by an elongated tail plate 40 by two carriage bolts 39 passing upwardly through slots 39a in the plate 40 and slots 39b in the bracket 37.

In the present form of the rocker 36, there is the tail plate 40 having an upturned forward end merging integrally into an overlying bar 41 inclined upwardly and rearwardly extending in spaced relation over a rear portion of the plate 40. There is a post 42 integrally extending from the plate 40 merging by a top end into the underside of the bar 41 intermediate the bar 41 rear end and the joining of the forward end of the plate 40 to the bar 41, FIG. 5.

This post 42 is U-shaped in cross-section, open along its rear side. The height of this post 42 is such that when the tail plate 40 is bolted to the bracket 37, a substantial length of a point 25b of a guard 25 extends freely into a cavity 42a of the post 42 whereby the rocker 36, may be rocked up and down about the axis of its carrying shaft 32 or 33 as the case may be, with the guard 25 remaining relatively stationary.

The bar 41 extends downwardly and forwardly from the post 42 to terminate in a nose 43, the underside 43a of which is substantially parallel to the underside of the plate 40. A shoe generally designated by the numeral 44 straddles the nose 43 and is rockably connected thereto by a transversely extending pin 44a, FIG. 6. The shoe 44 carries a tail 45 along the under edge 43a of the nose 43 and turns upwardly and rearwardly thereunder by an arcuate end portion 45a. The forward end of the tail 45 merges into a forwardly and upturned glider 47. A bar 46 extends from the forward tip 47a rearwardly and upwardly over the portion 44b which straddles the nose 43.

When the tail 45 is against the nose under edge 43a, the tip 47a is above the axis of the pin 44a. The tail 45 has a mass exceeding that of that part of the shoe 44 which is forwardly of the pin 44a. Therefore, normally the tip 47a will be rocked upwardly until the portion 45b strikes the top of the nose 43, and the tail 45 will be hanging downwardly and rearwardly in spaced relation from the nose edge 43a. However, in operation, the tail 45 will be riding on the ground, with the shoe 44 in ground contact.

While the mounting of the rockers 36 has above been described in relation to a hexagonal section shaft, it is entirely possible and feasible to employ the square section shaft above referred to or the cylindrical shaft 48, FIG. 11, as a substitute in each instance for the hexagonal shafts 32 and 33. Then instead of having the hexagonal holes 37c in the ears, there will be cylindrical sleeves 49 fixed on each bracket 37 and the sleeve 49 will have a circumferential slot 50 through which a rocker limit pin 51 extends, the pin 51 being secured to the shaft 48. As indicated in FIG. 10, the square shaft 32b in each instance is rotatably carried through the bracket 34 as are the shafts 32 and 33. The shaft 32b extends loosely through square holes 37d and the bracket ears 37a. The dimensions across the flats of the shaft 32b are such that the ears 37a may rock therearound to a limited degree of rotation. The knives 24 reciprocate in the usual manner across the guards 25 without interference from the rockers 36.

Figure 18:
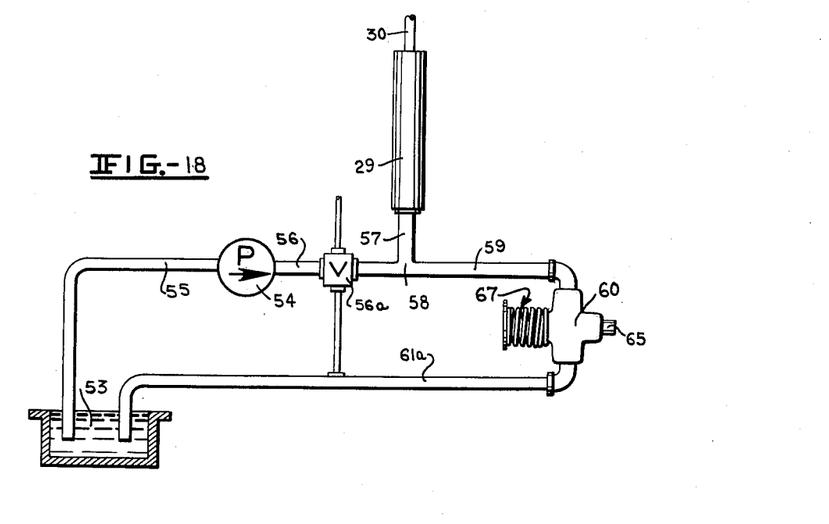
FIG. 18 is a schematic hydraulic flow diagram.

The combine 22 carries a hydraulic system, FIG. 18, comprising essentially an oil reservoir 53; a pump 54, drawing oil from the reservoir 53 through a pipe 55; a safety valve 56a; the pump normally discharging oil through a pipe 56 leading to a T 58 from which the oil may flow selectively to the hydraulic cylinder 29 through the hose 57 and through the hose 59 to one side of the control unit valve 60, and under proper manipulation of the valve 60 through a return line 61a back to the reservoir 53. The pump 54 will discharge the oil through the pipe 56 under pressure sufficient to operate the hydraulic lift shaft 30 to lift the platform 21, the valve 60 being employed to permit the return of the oil and thereby selectively reduce the pressure in the cylinder 29.

In this valve 60, there is a valve body 61 through which extends a longitudinal bore 62 relieved on either side of a central zone 63, and there is a transverse passageway 64 diametrically intercepting the bore 62, communicating to opposite sides of the body 61. A cylindrical rod 65 passes through the bore 62 with a sliding fit, and emerges by opposite ends from the body 61. The rod 65 is rotatable in the bore 62 as well as being longitudinally shiftable through the bore.

The rod 65 has a diametrical bore 66 normally opening by its opposite ends within the bore 62. The outer, opposite ends of the bore 64 connect respectively with the pipes 59 and 61a, FIG. 12.

Figures 12, 13:
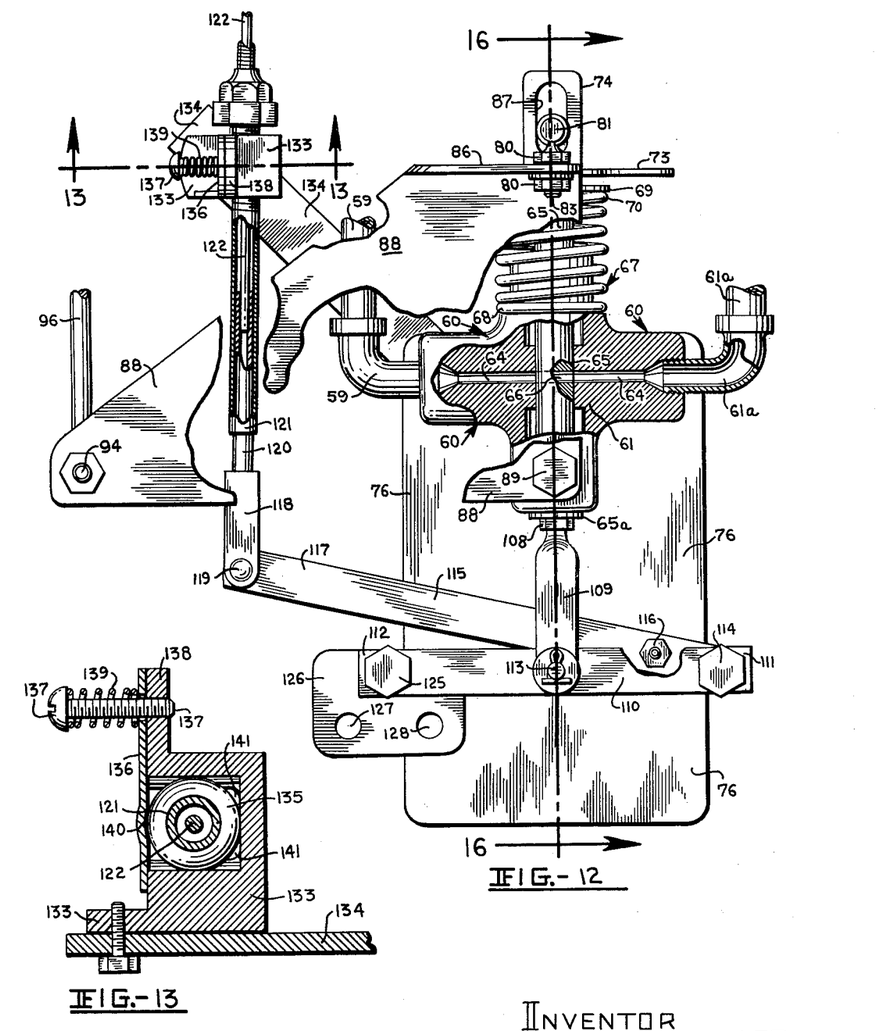
FIG. 12 is a top plan view in partial section of the main control unit.
FIG. 13 is a view in vertical section on the line 13—13 in FIG. 12.
Figures 14, 15, 17:
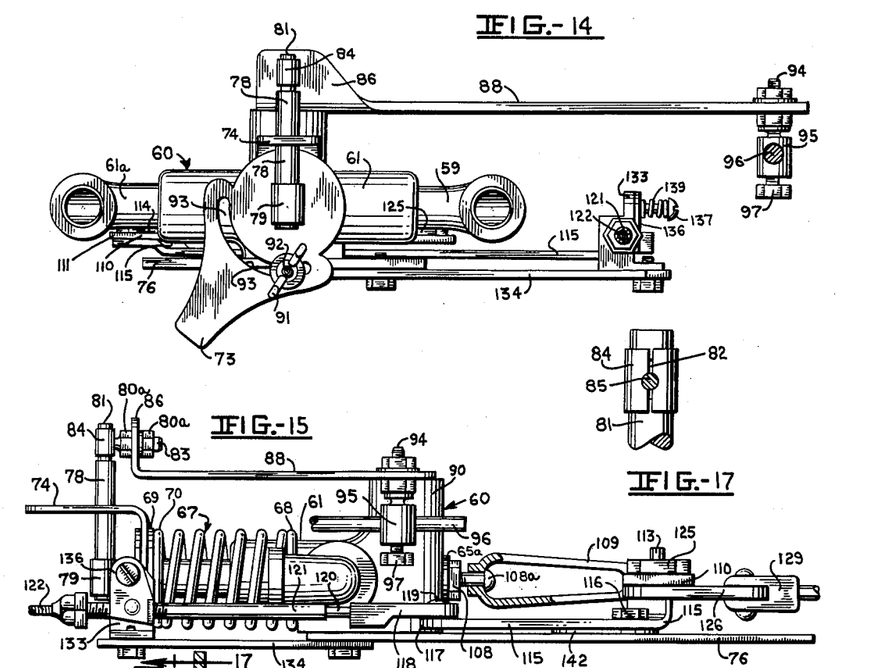
FIG. 14 is a view in rear elevation and in partial section of the control unit.
FIG. 15 is a view in side elevation and in partial section of the control unit.
FIG. 17 is a detail in vertical elevation and partial section of an interconnection employed on the control unit on the line 17—17 in FIG. 16.
Figure 16:
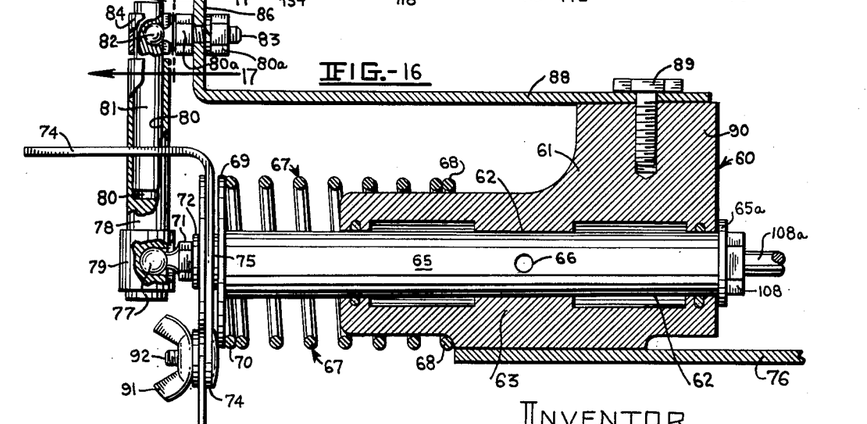
FIG. 16 is a vertical section on an enlarged scale longitudinally through the control unit on the line 16—16 in FIG. 12.

A compression spring 67 bears by one end 68 against the body 61 of the valve, FIGS. 12, 15, and 16, and a washer 69 at the other end 70. This washer 69 is held against the end of the rod 65 by a stud 71 which passes through a washer 72, an adjusting plate 73, a holder bracket 74, a washer 75, and the spring retainer washer 69, a holder bracket 74, a washer 75, and the spring retainer washer 69, to screw-threadedly engage in the rod 65. The spring 67 is in its initial condition, as shown in the various figures, and maintains the rod 65 at the longitudinal position within the bore 62 with the washer 65a fixed on the opposite end of the rod 65 abutting the body 61 whereby the transverse passageway 66 is registered with the passageway 64 through the body, as specifically indicated in FIG. 16.

Figure 1:
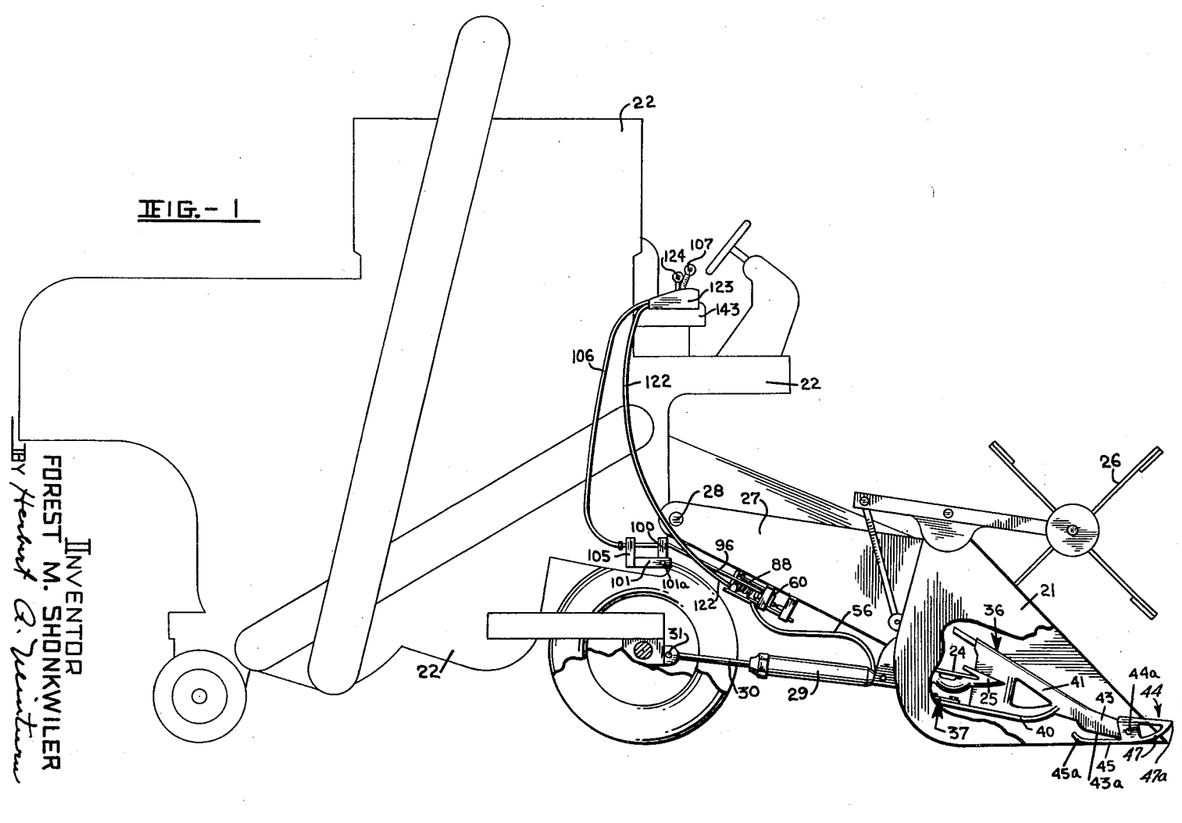
FIG. 1 is a diagrammatic representation of the invention applied to a self-propelled combine.

The valve body 61 is normally secured in fixed position to a base plate 76 which in turn is secured to a convenient position on the combine, herein shown as on the underside of the element 27, FIG. 1.

The stud 71 has a ball 77 entered into a hole in a rod 78, that is carried at right angles to the axis of the rod 65. A split sleeve 79 fits around the rod 78 and receives the neck of the ball 77 through the split whereby the rod 78 will be rockably retained on the ball 77.

The rod 78 extends beyond the sleeve 79 by an end which is provided with a bore 80 and into which bore 80 there is a slide rod 81 extending from the rod 78. This slide rod 81 receives the ball end 82 of a stud 83, and the ball 82 is retained in this slide rod 81 by a sleeve 84, which is longitudinally split to encircle the slide rod 81 and extend around the neck of the ball intervening between the ball end 82 and the stud 83, FIG. 17, the neck being designated by the numeral 85, this structure being the same as that which retains the ball 77.

The stud 83 is fixed through a flange 86 by means of nuts 80a, one on each side of the flange, so that the stud 83 is held against movement in relation to the flange 86. The rod 78 extends freely through a longitudinal slot 87, FIG. 12, in the holder bracket 74, the axis of the slot 87 being parallel to the axis of the rod 65. The flange 86 is an integral part of a bell crank lever 88, which is pivoted on a cap screw 89 engaging in a boss of the valve body 61 whereby the lever 88 may rock about the cap screw 89 in a plane parallel to the axis of the rod 65.

The holder bracket 74 may be rocked on the end of rod 65. However the member 73 is fixed to the rod 65, and by rocking it, the valve rod 65 may be rotated within the bore 62. This rotation may be had by loosening a wing nut 91 screw-threadedly engaging a bolt 92 which is fixed to the holder bracket 74 and extends through an arcuate slot 93 so that when the nut 91 is loosened, the member 73 may be rocked to correspondingly rotate the rod 65, the rocking of the member 73 being in relation to the holder 74. This adjustment and its purpose will be explained further in the description of the operation.

A bolt 94, FIGS. 12 and 14, is fixed to the lever 88 (herein shown as substantially formed in the nature of a triangle) at its outer free end removed from the pivot 89 and the bolt 83. This bolt 94 carries a swivel head 95 through which a control rod 96 may be inserted and secured in selected longitudinal positions by means of a screw 97.

Figure 20:
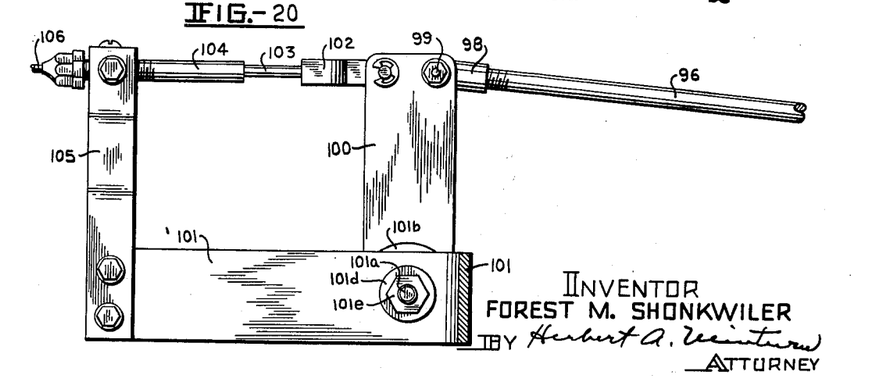
FIG. 20 is a view reduced in scale and in side elevation and partial section of the structure illustrated in FIG. 19.

This control rod 96 is connected by its end removed from the member 95 to a head 98 rockable on a bolt 99, FIG. 20, and this bolt 99 is supported by a lever 100 rockably secured by a pivot bolt 101a to a bracket 101 which will be fixed in position at a suitable place on the combine with the lever 100 turned by its bolt 99 end toward but somewhat below and to the rear of the pivot 28 of the table 21, FIG. 11. The lever 100 in turn has connected thereto a terminal 102 to which is secured a rod 103 in turn slidably entering a sleeve 104 fixed on an upright fixed arm 105. A flexible cable 106 enters the sleeve 104 wherein it is secured to the rod 103 so that by pulling and pushing the cable 106, the rod 96 may accordingly be pushed and pulled. This cable 106 is carried to a controller to be operated by a lever 107 serving as the manual control lever. Rocking the lever 107 pushes and pulls the cable 106 to in turn accordingly shift the rod 96 to rock the bell crank lever 88, FIG. 2.

Figure 19:
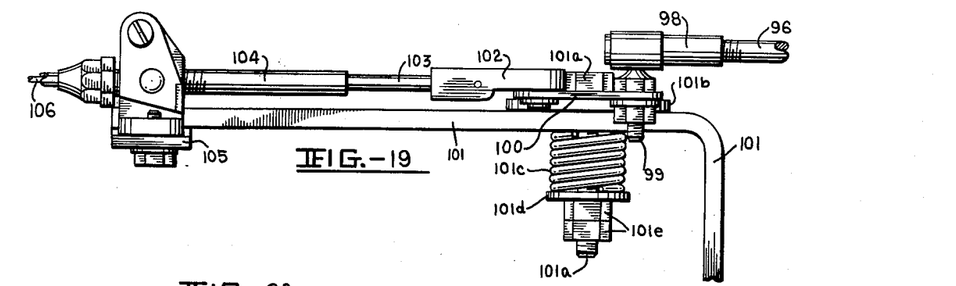
FIG. 19 is a detail in top plan of a controller unit actuating mechanism.

Rocking of the lever 100 is yieldingly resisted and is held in selected positions by means of a friction brake, FIG. 19, as follows. A friction ring 101b, made of a material such as brake lining, is interposed between the lever 100 and the bracket 101. The bolt 101a has a compression spring 101c encircling it between the bracket 101 and a washer 101d adjustably positioned along the bolt 101a by the nuts 101e.

The rod 65 at its end extending from the valve body 61 on the opposite side from the spring 67, screw-threadedly receives a cap screw 108 retaining the washer 65a, and into which is threaded a second cap screw 108a rotatably carrying the base of a yoke 109. This yoke 109 straddles a lever 110, FIGS. 12 and 15, intermediate its pivot ends 111 and 112 and is rockably secured thereto by means of a pin 113.

The lever 110, at its end 111, is rockably attached by a bolt 114 to an end portion of an underlying lever 115. In turn, FIGS. 12 and 15, the lever 115 is rockably attached to the base 76 by a pivot bolt 116 held by the base 76. This pivot bolt 116 is spaced from but adjacent to the end 111 of the lever 110. This lever 115 extends from its pivot bolt 116 to a free end 117 where a cable head 118 is rockably attached by means of the pin 119. This cable head has a tube 120 fixed thereto, and in turn this tube slidingly fits within a larger tube 121 wherein there is a cable end 122 fixed to the tube 120. The cable 122 extends up to a second controller lever 124 rockably carried by a housing 123 which also carrys the lever 107. Rocking the lever 124 will cause the cable 122 to be pushed and pulled, to in turn rock the levers 115 and 110 and in turn shift the yoke 109 to accordingly shift the valve rod 65 longitudinally.

On the free end 112 of the lever 110, there is rockably connected thereto through the cap screw 125 a plate 126 which is in the nature of a singletree, having two holes 127, 128 equally spaced apart from a center line drawn through the bolt 125.

In the present form of the invention, a turnbuckle 129 is engaged to the plate 126 through the hole 127, and has a cable 131 fixed to the turnbuckle 129, from which the cable extends to a lever 35 on the shaft 33. Likewise a second turnbuckle 130 is engaged to the plate 126 through the hole 128. A cable 132 extends from this turnbuckle 130 down to the other lever 35 which is on the shaft 32.

Referring to the cable 122, there is a supporting head 133 which detachably holds in fixed position the end of the tube 121. This head 133, FIG. 13, is secured to an arm 134 which is fixed to and extends from the platform 76, FIGS. 2, 12, and 15. The tube 121 carries an encircling rubber body 135, FIG. 13, attached to the tube 121. The body 133 is notched out to receive the body 135 by a tight fit, and a retaining plate 136 is rockably attached through the screw 137 to an upwardly extending portion 138 of the body 133, a compression spring 139 being positioned between the head of the screw 137 and the plate 136. This plate 136 may be rocked about the screw 137 to have a cupped portion 140 bear against the body 135 and urge it into the notch 141 and thereby retain the body 135 therein by pressure of the spring 139, this construction permitting a quick release of the tube 122 when adjustments have to be made.

OPERATION

Manual Control

To place the invention structure in operation, after being applied to the combine as above described, the following steps are taken.

Both levers 107 and 124 are pushed to the left, FIG. 2. The rod 96 is not connected to the bell crank lever 88. The wing nut 91 is loosened. Both cables 131 and 132 are slack. The post 78 through its extension 81 is rocked to have its axis extend substantially perpendicular to the base plate 76, in which position, the valve rod 65 is in a rotated position to have its bore 64 in substantially full communication with the body passageway 64 whereby full fluid flow therethrough is had with no operating pressure of the fluid existing in the cylinder 29.

The pump 54 will be running, causing the fluid to circulate from the pump 54 and through the valve rod bore 66 back to the reservoir 53 without building up operating pressure in the cylinder 29 until the valve rod 65 may be shifted to restrict that circulating flow.

The platform 21 will be resting on the ground and the rockers 36 will be extending forwardly of the cutter bar 20 and also resting on the ground.

The adjusting plate 73 is rotated, in turn rotating the valve rod 65, to reduce the openings from the rod bore to the passageway 64, and thereby restrict the flow of the fluid therebetween to that degree which cause a pressure build up in the cylinder 29 just sufficient to balance the weight of the platform 21 thereagainst with the platform having a tendency to rise and to permit the platform to be pushed up and back down by hand, "floating" on the fluid pressure. The adjusting plate 73 is then secured to the bracket 74 by tightening the nut 91. Both levers 107 and 124 remain so far in their lefthand positions.

The lever 88 is rocked clockwise, FIG. 2, rocking the post 78–81, in turn rotating the valve rod 65. It is to be noted that, by reason of the extension 81, the post 78, after being rocked by the lever 88, will only rock so far until the extension 81 will start traveling longitudinally of the post 78 whereby the degree of rocking of the post 78 reduces, giving an initial quick rod 65 rotation but gradually slowing the speed of rotation as the lever 88 continues rotation.

The lever 88 is rocked only a slight degree until the valve rod rotation increases fluid flow therethrough to allow the platform 21 to rest on the ground without tending to lift. The rod 96 is then connected to the lever 88 as above described. The lever 107 is then in control of the rotation of the valve rod 65.

It is to be observed that the lever 107 is a second class lever rocking on a pivot 107a with the cable 106 attached above the pivot 107a at the point 107b. The lever 124 is a first class lever rocking on the pivot 124a with the cable 122 attached below the pivot 124b.

The turnbuckles 129 and 130 are adjusted to put the cables 131 and 132 under tension which will tend to rotate clockwise, the shafts 32 and 33. This tension is set up by resistance to compression of the spring 67 through the valve rod 65, yoke 109, lever 110, the equalizer plate 126, turnbuckles 129 and 130, cables 131 and 132, rock levers 35 on the shafts 32 and 33, and rockers 36 either resting on the ground or when out of ground contact in their maximum clockwise travel, FIG. 5, when the upper ends of the cavity 42a bear against the topside of the guard points 25b. This tension is designed to rock the shafts 32 and 33 clockwise, FIGS. 5 and 9, yieldingly retaining at least the tail portion 45 of the rockers normally on the ground. In FIGS. 5, 9, 10 and 11, the shiftable members are shown in positions before the tension is set up under this tension in the cables 131 and 132, the shafts 32 and 33 will be rotated clockwise sufficiently to bring in each instance a ridge or corner 32a around to come against the next point 38 as indicated by the dash lines in FIG. 9 whereby the rocker 37 is rotated or tended to be rotated clockwise.

The valve rod 65 is moved longitudinally against the resistance of the spring 67 a distance less than the diameter of the passageway 64 opening into the body bore 62 in this tensioning operation whereby the rotation of the rod 65 also may be effective in the control of the fluid traversing the rod bores 66.

Now in the manual operation, the lever 124 remains stationary in its right position wherein the left hand end 117 of the lever 115, FIG. 12, is held in its maximum degree of travel toward the body 61. The lever 110 rocks on its pivot bolt 114, FIG. 12, which has been swung by the lever 115 to its maximum distance away from the body 61.

The manual control lever 107 is rocked forwardly or to the right, FIG. 2, to rotate the valve rod 65 to restrict the flow of fluid across the rod 65, increasing pressure of the fluid in the cylinders 29 to lift the platform 21 to position the cutter bar 20 at the desired cutting height above the ground. The rockers 36 will be inclined downwardly ahead of the cutter bar 20 to have the shoe tail 45 sliding along over the ground. Normally this tail, being heavier than the shoe portion ahead of the pivot pin 45a, will be inclined downwardly and rearwardly somewhat so that the rear portion will have the ground contact.

The shaft 32 counterclockwise rotation due to lift of a rocker riding over an obstruction will rock the lever 35 fixed on the shaft and in turn increase the pull on the cable 131 while the cable 132 remains under tension due to the other non-lifted rockers having contact with the ground. The pulling on the cable 131 tends to rock the plate 126 somewhat, but also, through the plate 126, will rock the lever 110 to shift the valve rod 65 to restrict further the effective opening from the passageway 64 into the rod bore 65, thus increasing pressure at the cylinder 29, causing the platform to lift and carry that actuating rocker 36 over the obstacle while lifting the cutter bar 20 to clear the obstacle.

In this platform lifting action, the rocker 36 leaves its normal ground riding position yielding maintained by the spring 67, and with the shaft 32, FIG. 9, in the dash line position and, as the rocker 36 rocks up (counterclockwise, FIG. 9) the shaft 32 is rotated against the increasing tension being applied to the spring 67 thereby longitudinally sliding the rod 65 to increase cylinder 29 pressure and hold it while the rocker traverses the obstacle. Other rockers 36, free of the obstacle will, of their own weight ride on the ground through the degree of lost motion provided between the dash and solid lines indicated in FIG. 9, but after that lost motion is taken up will be rocked upwardly by further rotation of the shaft 32. Then, when the obstacle riding rocker passes the obstacle and starts to rock downwardly, the tension of the spring 67 reduces, sliding back the rod 65 to reduce cylinder 29 pressure and, with sufficient remaining tension, rotate to again yieldingly retain that rocker, as well as the others, in ground contact.

Of course, if the cutter bar 20 is to operate at a sufficiently high elevation and the shoes do not then come into contact with the ground, the rockers 36 may be removed, there then being no need to lift and lower the platform 21 over obstacles, and the entire control is had through the manual control lever 107.

*Full Automatic Control*

In full, automatic operation, the apparatus is set up as has been described for manual control, and both levers 107 and 124 are shifted fully forward or clockwise, FIG. 2. The lever 107 has then rotated the valve rod 65 to substantially its full fluid flow thereacross. The lever 124 has then moved the lever 115 to shift the pivot bolt 114 somewhat closer to the body 61, allowing the lever 110 to rock on the bolt 125 and thus allow the valve rod 65 to shift a trifle longitudinally to bring the rod bore 66 more nearly into position for full fluid flow therethrough. So, by selective shifting the lever 124 rearwardly, this fluid flow through the rod bore 66 may be increased and reduced, automatically varying the fluid pressure in the cylinder 29 and thereby lifting and permitting lowering of the platform 21 to locate the platform at the desired elevation accordingly, the lever 124 then remaining stationary.

The rockers 36 will automatically lift and permit lowering of the platform as above described. The lever 107 is not moved from its forwardly shifted position.

The shafts 32 and 33 are provided in the relatively short lengths rather than having a single, long shaft. In many instances one of the short shafts will remain substantially non-rotative, while the other shaft will rotate upon a rocker riding over an obstruction. The travel of the platform up and down is made more smoothly by not having to build up sufficient fluid pressure to lift all the other shaft rockers from ground contact. Moreover, a certain compensating action is had between the two shafts through the rockable plate 126. The action of the apparatus, by reason of its peculiar operation is smooth, and travel of the platform 21 starts smoothly and stops smoothly without jerks, and yet is sufficiently responsive to the requirements to hold the selected cutter bar 20 elevation, and return it to that elevation quickly upon passing over an obstruction.

Mention has been made above of the mounting of the bracket 101 at a fixed position on the combine 22 with the lever 100 top end somewhat below and to the rear of the pivot 28. This mounting provides for an automatic slight travel of the rod 96 induced by the elevator or chute 27 of the platform 21 rocking on the pivot while the rod 100 is rockable on the pivot 101a at a fixed point. The forward end of the rod 96 will thus shift the lever 88 slightly tending to vary slightly the fluid pressure across the rod 65 in the travel of the platform, modifying the other controls.

In this automatic control operation, as the fingers 36 are carried to a high lift, the rod 96 tends to rotate the lever 88 to a degree depending upon the travel of the platform 21 in that lifting. By reason of the fact that the rod 96 has a pivot on the lever pin or bolt 99 which is stationary during that platform lift while the control lever 107 is also stationary at its forward position, and further, by reason of the platform 21 rocking also about the stationary pivot 28, and the two pivots are spaced apart as has been described, as the platform 21 rocks upwardly, the distance from the connection 94 on the lever 88 to that rod 96, pivot 99 tends to increase and to do so increasingly as the platform lifts higher. The only thing then that gives is the rocking of the lever 88 on its pivot 89. In so rocking, the lever then turns the rod 65 to increase the effective fluid flow across the passageway 66, and thus first reduce the speed of the lift travel and then allow the platform to descend to come down to be under the control of the rockers 36 at the elevation of the bar 20 as set by the position of the lever 124.

Therefore, while I have herein shown and described my invention in one particular form, it is obvious that many structural variations may be employed in the leverage systems and controls all without departing from the spirit of the invention, and I therefore do not desire to be limited to that precise form beyond the limitations which may be imposed by the following claims.

I claim:

1. A sensing rocker for a combine having a vertically rockable cutter bar carrying knife guards extending forwardly and comprising means rockably mounting the rear end of the rocker on the cutter bar to have its forward end extend ahead of the cutter bar; a shoe pivoted on the front end of said rocker and rockable in vertical directions; said rocker having a vertically extending cavity into which a guide may extend to confine said rocker against lateral movement during rocker vertical travel; said shoe having an under, main slide extending rearwardly of the pivot axis of the shoe and merging into an upturned portion forwardly of the pivot axis, a shoe portion straddling the rocker back of said axis, carrying said cavity; an upper portion fixed to said shoe ahead of the axis and extending rearwardly and upwardly from said under slide and over said cavity carrying portion; said shoe having weight distribution causing the main slide length to drop downwardly as the rocker may be lifted upwardly causing said slide forward portion to rock upwardly to a degree limited by the height of said cavity; said mounting means comprising a shaft rockably carried along and under said cutter bar; a bracket detachably secured to a rear end portion of said rocker; said bracket having an opening transversely therethrough, through which said shaft slidingly and freely passes therethrough; an abutment on said shaft; an abutment on said bracket in the path of and circumferentially spaced from the shaft abutment providing a limited degree of rocking of the bracket around said shaft and a reverse rocking of the shaft to rock the bracket in the opposite direction.

2. The structure of claim 1 in which said shaft is hexagonal in cross-section and the corners of the shaft constitute the shaft abutments, and bracket opening is larger than the major diameter of the shaft, and said bracket abutment constitutes one of six abutments which are projections from the periphery of the bracket opening into the paths respectively of the shaft corners, said rocker being selectively positioned along said shaft by detaching the bracket from its mounting and sliding the bracket along the shaft to the selected position under a guard and then placing the rocker to receive the guard and securing the rocker to its bracket.

3. The combination with a
   land traveling vehicle having a rear portion and a forward portion rockable vertically about the axis of a pivot on the vehicle, a fluid receiving cylinder for raising said portion, and a fluid pressurizing source: of
   at least one obstacle sensing rocker, rockably carried by and extending primarily ahead of the front of said portion;
   lever means rocking said rocker;
   a slide rod having a transverse bore therethrough and having one end interconnected with said lever means;
   a body longitudinally and slidingly receiving said rod therethrough and having a bore thereacross said body being carried by said vehicle rear portion;
   a spring interconnected with said rod and normally biasing the rod to rock said rocker downwardly, said spring normally longitudinally positioning said rod to have its transverse bore in part at least in registery with said body-through-passageway the degree of registery depending upon the desired position of said body forward portion;
   fluid conducting means forming a continuous flow circuit from the output of said source, through said body bore, and return to said source, said cylinder being connected to said circuit between said output and said body bore, fluid pressure in said cylinder being varied from a minimum to a maximum in said cylinder from full to non-registery of the rod bore with the body bore.

4. The structure of claim 3 in which there is
   a manual variable fluid pressure control, comprising a member mounted on said rear portion eccentrically of said pivot axis;
   means rotating said rod;
   means interconnecting said member and said rod rotating means and rotating said rod upon up and down travel of said front portion said rod rotation modifying said rod and body bore registery.

5. The structure of claim 3 in which there is
   a shaft axially rotatably mounted across said front portion;
   at least one abutment on said shaft;
   said rocker being rockably carried on said shaft; and
   a pair of abutments carried by said rocker, one on each circumferential side of the shaft abutment and providing free rocking of the rocker about the shaft limited by said abutments; and
   said lever means being carried by said shaft.

6. The structure of claim 4 in which
   said member constitutes a rockable lever; and there is friction means normally retaining said rockable lever in a predetermined position relative to said rear body portion.

7. The structure of claim 6 in which there is a manual control means affecting rod rotation and overcoming said friction means and variably rocking said rockable lever to other selected positions retained by said friction means.

8. The structure of claim 7, in which said rod rotating means comprises
   a holder bracket rotatably carried by said rod;
   an adjusting plate fixed to said rod;
   means selectively fixing the plate to said bracket; and
   said interconnecting means interconnecting with said holder bracket.

9. The structure of claim 3 in which there is a second manual control means controlling fluid pressure in said cylinder, in which there is a leverage system between said rod and said rocker lever means which system includes a lever varying by its rocking the longitudinal position of the rod in said body;

a member connecting with and rocking the varying lever; and frictional means retaining said last member in predetermined positions.

References Cited in the file of this patent

UNITED STATES PATENTS

| | | |
|---|---|---|
| 2,014,569 | Huddle | Sept. 17, 1935 |
| 2,589,553 | Kesselring | Mar. 18, 1952 |

FOREIGN PATENTS

| | | |
|---|---|---|
| 840,852 | Great Britain | July 13, 1960 |